United States Patent
Shen

(10) Patent No.: US 7,962,491 B1
(45) Date of Patent: *Jun. 14, 2011

(54) DOCUMENT NEAR-DUPLICATE DETECTION

(75) Inventor: Shioupyn Shen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/630,645

(22) Filed: Dec. 3, 2009

Related U.S. Application Data

(63) Continuation of application No. 10/808,326, filed on Mar. 25, 2004, now Pat. No. 7,707,157.

(51) Int. Cl.
G06F 7/00 (2006.01)
G06F 17/30 (2006.01)
(52) U.S. Cl. .......................... 707/749; 707/738; 707/748
(58) Field of Classification Search .................... None
See application file for complete search history.

(56) References Cited

U.S. PATENT DOCUMENTS

| | | | |
|---|---|---|---|
| 4,290,105 A | 9/1981 | Cichelli et al. | |
| 5,745,900 A | 4/1998 | Burrows | |
| 5,845,005 A | 12/1998 | Setlak et al. | |
| 6,230,155 B1 | 5/2001 | Broder et al. | |
| 6,286,006 B1 | 9/2001 | Bharat et al. | |
| 6,351,755 B1 | 2/2002 | Najork et al. | |
| 6,393,438 B1 | 5/2002 | Kathrow et al. | |
| 6,658,423 B1 | 12/2003 | Pugh et al. | |
| 2002/0133499 A1 | 9/2002 | Ward et al. | |
| 2003/0105716 A1 | 6/2003 | Sutton et al. | |
| 2003/0208761 A1 | 11/2003 | Wasserman et al. | |
| 2005/0210043 A1 | 9/2005 | Manasse | |
| 2006/0036684 A1 | 2/2006 | Schwerk | |

OTHER PUBLICATIONS

Broder, Andrei et al., "Clustering the Web", http://research.compaq.com/src/articles/199707/cluster.html; Systems Research Center, Palo Alto, California, Feb. 4, 2004 (Print Date), 5 pages.
Narayanan Shivakumar et al.; SCAM: A Copy Detection Mechanism for Digital Documents; Proceedings of the $2^{nd}$ International Conference on Theory and Practice of Digital Libraries; 1995; 9 pages.
Saul Schleimer; Winnowing: Local Algorithms for Document Fingerprinting; Proceedings of SIGMOD 2003; Jun. 9-12, 2003; 10 pages.
Moses S. Charikar; Similarity Estimation Techniques from Rounding Algorithms; STOC 2002; May 19-21, 2002; 9 pages.
Gautam Pant et al.; Crawling the Web; 2003; 25 pages.
Michael O. Rabin; Fingerprinting by Random Polynomials; Technical Report TR-15-81; Harvard University, 1981; 14 pages.
Office Action from U.S. Appl. No. 11/094,791, dated Jul. 23, 2007; 25 pages.
Arvind Jain et al.; U.S. Appl. No. 11/094,791, filed Mar. 31, 2005; "Near Duplicate Document Detection for Web Crawling"; 46 pages.
Co-pending U.S. Appl. No. 10/808,326, filed Mar. 25, 2004 entitled "Document Near-Duplicate Detection" by Shioupyn Shen, 33 pages.

(Continued)

*Primary Examiner* — Tim T. Vo
*Assistant Examiner* — Garrett Smith
(74) *Attorney, Agent, or Firm* — Harrity & Harrity, LLP

(57) ABSTRACT

A near-duplicate component includes a fingerprint creation component and a similarity detection component. The fingerprint creation component receives a document of arbitrary size and generates a compact "fingerprint" that describes the contents of the document. The similarity detection component compares multiple fingerprints based on the hamming distance between the fingerprints. When the hamming distance is below a threshold, the documents can be said to be near-duplicates of one another.

36 Claims, 9 Drawing Sheets

OTHER PUBLICATIONS

Arvind Arasu et al.; Extracting Structured Data from Web Pages; Proceedings of the ACM SIGMOD 2003, 2003; 30 pages.

Brenda S. Baker; A Theory of Parameterized Pattern Matching: Algorithms and Applications (Extended Abstract); $25^{th}$ ACM STOC 1993; 1993; pp. 71-80.

Brenda S. Baker; On Finding Duplication and Near-Duplication in Large Software Systems; Proceedings of the $2^{nd}$ Working Conference on Reverse Engineering; 1995; 10 pages.

Andrei Z. Broder; On the Resemblance and Containment of Documents; Proceedings of the Compression and Complexity of Sequences; 1997; pp. 1-9.

Krishna Bharat et al.; Mirror, Mirror on the Web: A Study of Host Pairs of Replicated Content; Proceedings of the $8^{th}$ International Conference on World Wide Web (WWW 1999); 17 pages.

Krishna Bharat et al.; A Comparison of Techniques to Find Mirrored Hosts on the WWW; Journal of the American Society for Information Science; 2000; 11 pages.

Krishna Bharat; The Connectivity Server: Fast Access to Linkage Information on the Web; Proceedings of the $7^{th}$ International Conference on the World Wide Web; 1998; 13 pages.

Andrei Z. Broder et al.; Min-Wise Independent Permutations; Proceedings of STOC; 1998; pp. 630-659.

Sergey Brin et al.; Detection Mechanisms for Digital Documents; Proceedings of the ACM SIGMOD Annual Conference, 1995; 12 pages.

Andrei Z. Broder et al.; Syntactic Clustering of the Web; Proceedings of WWW6, 1997; 13 pages.

James W. Cooper et al.; Detecting Similar Documents Using Salient Terms; Proceedings of the CIKM 2002; Nov. 2002; pp. 245-251.

Edith Cohen et al.; Finding Interesting Associations without Support Pruning; Proceedings of the $16^{th}$ ICDE; 2000; 12 pages.

Abdur Chowdhury et al.; Collection Statistics for Fast Duplicate Document Detection; ACM Transactions on Information Systems; vol. 20, No. 2; Apr. 2002; pp. 171-191.

Z iyuan Chen et al.; Selectively Estimation for Boolean Queries; Proceedings of PODS 2000; 2000; 10 pages.

Jack G. Conrad et al.; Constructing a Text Corpus for Inexact Duplicate Detection; SIGIR 2004; Jul. 2004; pp. 582-583.

Scott Deerwester et al.; Indexing by Latent Semantic Analysis; Journal of the American Society for Information Science; 1990; 34 pages.

Jeffrey Dean et al.; Finding Related Pages in the World Wide Web; Proceedings of the Eighth International World Wide Web Conference; 1999; pp. 1-15.

Aristides Gionis et al.; Efficient and Tunable Similar Set Retrieval; Proceedings of SIGMOD 2001; 2001; 12 pages.

Taher H. Haveliwala et al.; Scalable Techniques for Clustering the Web; Proceedings of the $3^{rd}$ International Workshop on the Web and Databases (WebDB 2000); 2000; 6 pages.

Taher H. Haveliwala et al.; Evaluating Strategies for Similarity Search on the Web; Proceedings of the $11^{th}$ International World Wide Web Conference; May 2002; 11 pages.

Khaled M. Hammouda et al.; Efficient Phrase-Based Document Indexing for Web Document Clustering; IEEE Transactions on Knowledge and Data Engineering; vol. 16, No. 10, Oct. 2004; pp. 1279-1296.

Timothy C. Hoad et al.; Methods for Identifying Versioned and Plagiarised Documents; Journal of the American Society for Information Science and Technology; 2003; pp. 1-18.

Sachindra Joshi et al.; A Bag of Paths Model for Measuring Structural Similarity in Web Documents; Proceedings of the $9^{th}$ ACM International Conference on Knowledge Discovery and Data Mining (SIGKDD 2003); Aug. 2003; pp. 577-582.

Jon M. Kleinberg; Authoritative Sources in a Hyperlinked Environment; Journal of the ACM; 1999; 34 pages.

Aleksander Kotcz et al.; Improved Robustness of Signature-Based Near-Replica Detection via Lexicon Randomization; SIGKDD 2004; Aug. 2004; 6 pages.

Ravi Kumar et al.; Trawling the Web for Emerging Cyber-Communities; Computer Networks: The International Journal of Computer and Telecommunications Networks; 1999; 21 pages.

Udi Manber; Finding Similar Files in a Large File System; Proceedings of the 1994 USENIX Conference; 1994; 11 pages.

Athicha Muthitacharoen et al.; A Low-Bandwidth Network File System; Proceedings of the $18^{th}$ ACM Symposium on Operating System Principles (SOSP 2001); 2001; 14 pages.

Sean Quinlan et al.; Venti: A new Approach to Archival Storage; First USENIX Conference on File and Storage Technologies; 2002; 13 pages.

DOCUMENT NEAR-DUPLICATE DETECTION

RELATED APPLICATIONS

This application is a Continuation of U.S. application Ser. No. 10/808,326 filed Mar. 25, 2004, now U.S. Pat. No. 7,707,157, the entire disclosure of which is incorporated herein by reference.

BACKGROUND OF THE INVENTION

A. Field of the Invention

Systems and methods consistent with the principles of the invention relate generally to document processing and, more particularly, to comparing documents to find near duplicate documents.

B. Description of Related Art

There are a number of applications in which it may be desirable to determine whether documents are near duplicates of one another. In the context of the World Wide Web, for example, search engines typically provide a searchable index of numerous web pages. Frequently, web pages located at different locations may be duplicates or near duplicates of one another. Knowing when one web page is a near-duplicate of another can be beneficial both when archiving the web pages and when returning search results to a user in response to a search query.

An archive server, for example, may be designed to store an archive of all documents requested from a web server. The archive server may decide whether to store new incoming documents based on whether the new document is a duplicate or near-duplicate of a previously stored document.

Thus, there is a need in the art for accurate and efficient techniques for automatically detecting near-duplicate documents.

SUMMARY OF THE INVENTION

A method consistent with an aspect of the invention generates a representation of a document. The method includes sampling the document to obtain overlapping blocks, choosing a subset of the sampled blocks, and compacting the subset of the sampled blocks to a obtain the representation of the document.

Another method consistent with an aspect of the invention generates a representation of a document. The method includes sampling the document to obtain overlapping samples and selecting a predetermined number of the samples as those of the samples corresponding to a predetermined number of smallest samples or a predetermined number of largest samples. The method further includes setting bits in the representation of the document based on the selected predetermined number of the samples.

A device consistent with an aspect of the invention includes a fingerprint creation component and a similarity detection component. The fingerprint creation component generates a fingerprint of a predetermined length for an input document. The fingerprint is generated by sampling the input document, choosing a subset of the samples, and generating the fingerprint from the subset of the samples. The similarity detection component compare pairs of fingerprints to determine whether the pairs of fingerprints correspond to near-duplicate documents.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

As described herein, a near-duplicate component includes a fingerprint creation component and a similarity detection component. The fingerprint creation component receives a document of arbitrary size and generates a compact "fingerprint" that describes the contents of the document. Because the file size of the fingerprint is relatively small, it can be efficiently stored and retrieved from computer memory. Fingerprints from other documents can also be stored and easily and efficiently compared to one another by the similarity detection component to determine if the documents are duplicates or near-duplicates of one another.

Figure 1:
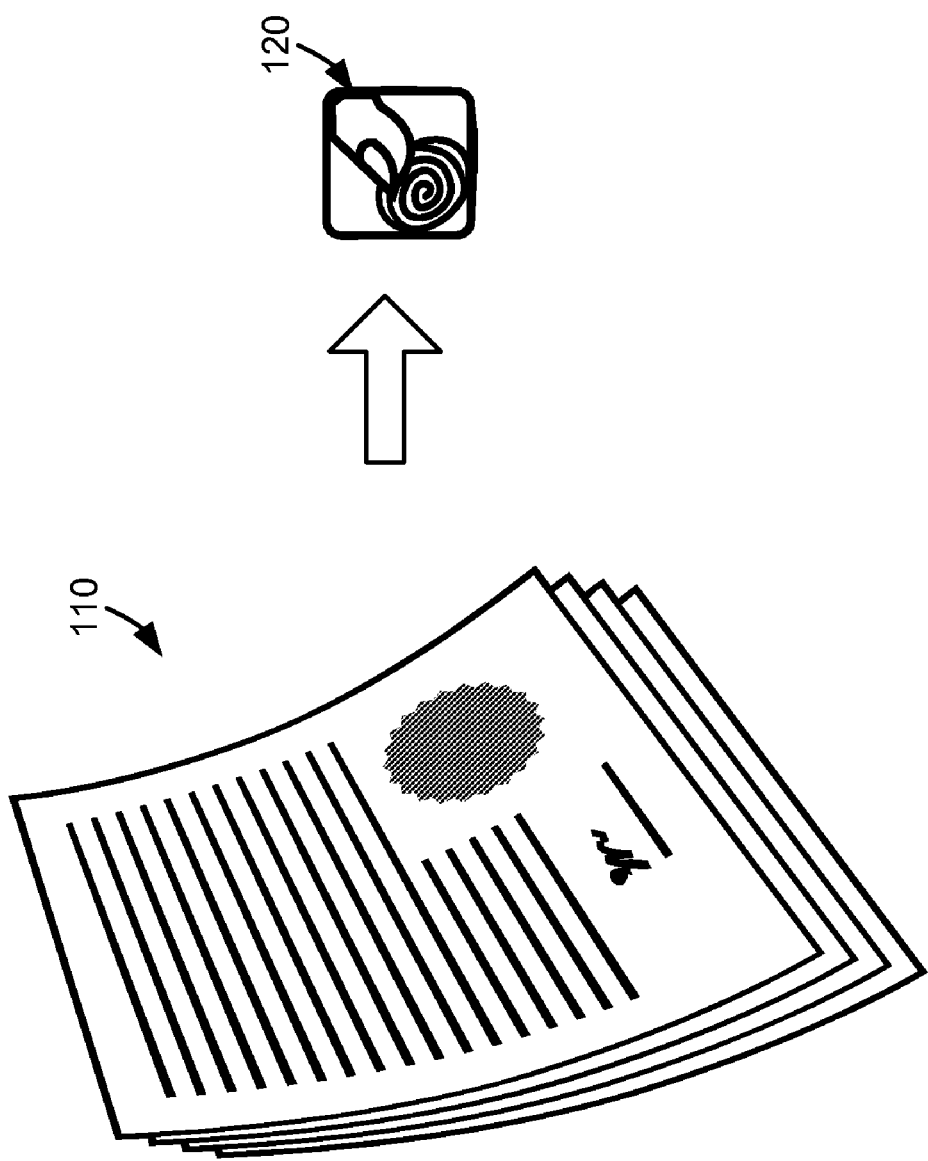
FIG. 1 is a diagram illustrating an exemplary overview of document near-duplicate detection.

FIG. 1 is a diagram illustrating a document and its fingerprint. Document 110 may be a relatively large document (e.g., 100,000 bytes). Fingerprint 120, created from document 110, is much smaller (e.g., 8 or 16 bytes). Despite the size difference, fingerprint 120 can be compared to other fingerprints to determine whether the underlying documents are near-duplicates of one another.

Exemplary Network Overview

Figure 2:
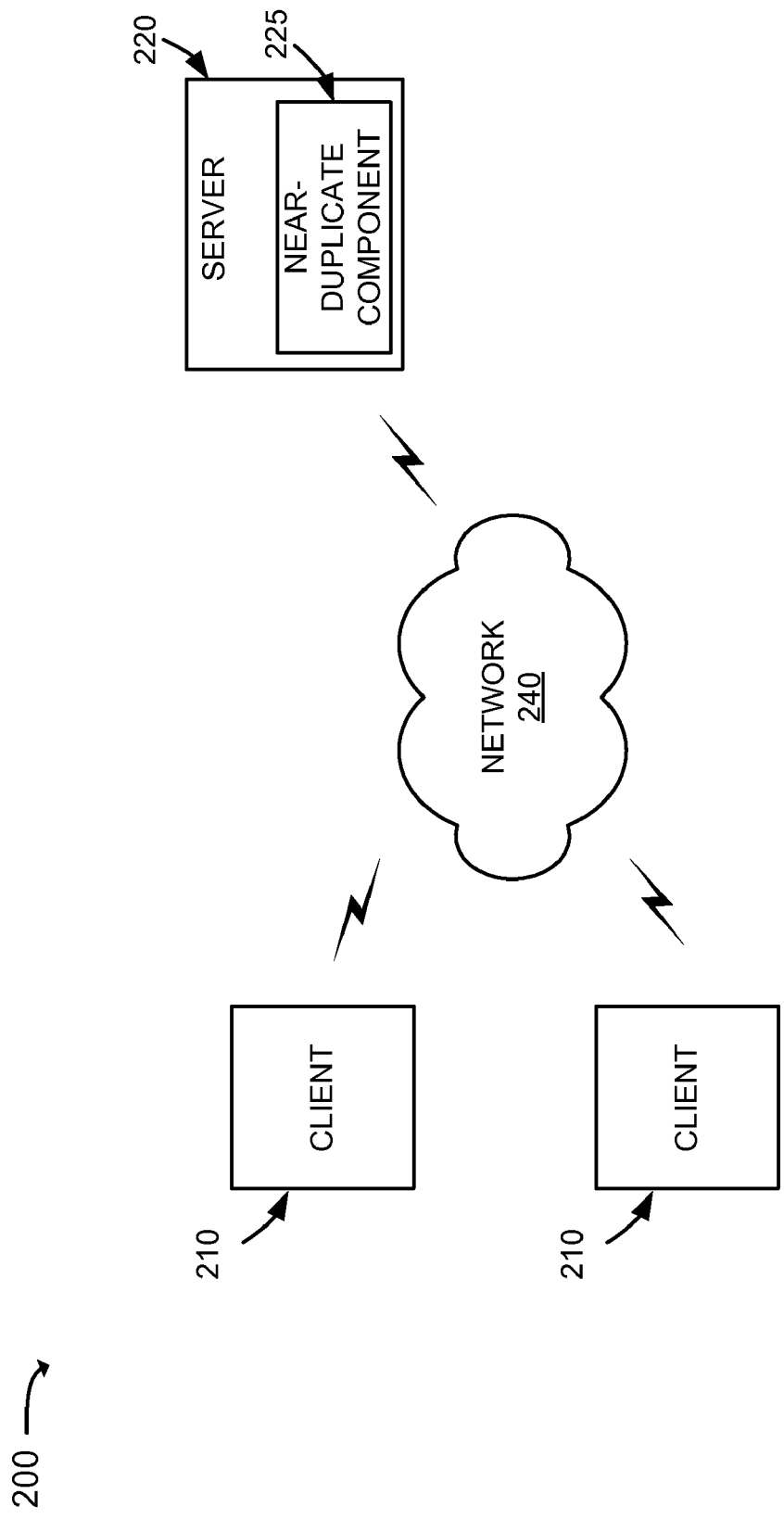
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Server 220 may include a server entity that processes, searches, and/or maintains documents in a manner consistent with the principles of the invention. Clients 210 and server 220 may connect to network 240 via wired, wireless, or optical connections.

In an implementation consistent with the principles of the invention, server 220 may implement near-duplicate component 225. In general, near-duplicate component 225 may receive documents from any of a number of possible sources, such as clients 210, server 220, or other server entities coupled to network 240. Near-duplicate component 225 may generate compact fingerprints for these documents and/or compare fingerprints to determine if two documents are duplicates or near-duplicates of one another.

A document, as the term is used herein, is to be broadly interpreted to include any machine-readable and machine-storable work product. A document may be an e-mail, a blog, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 3:
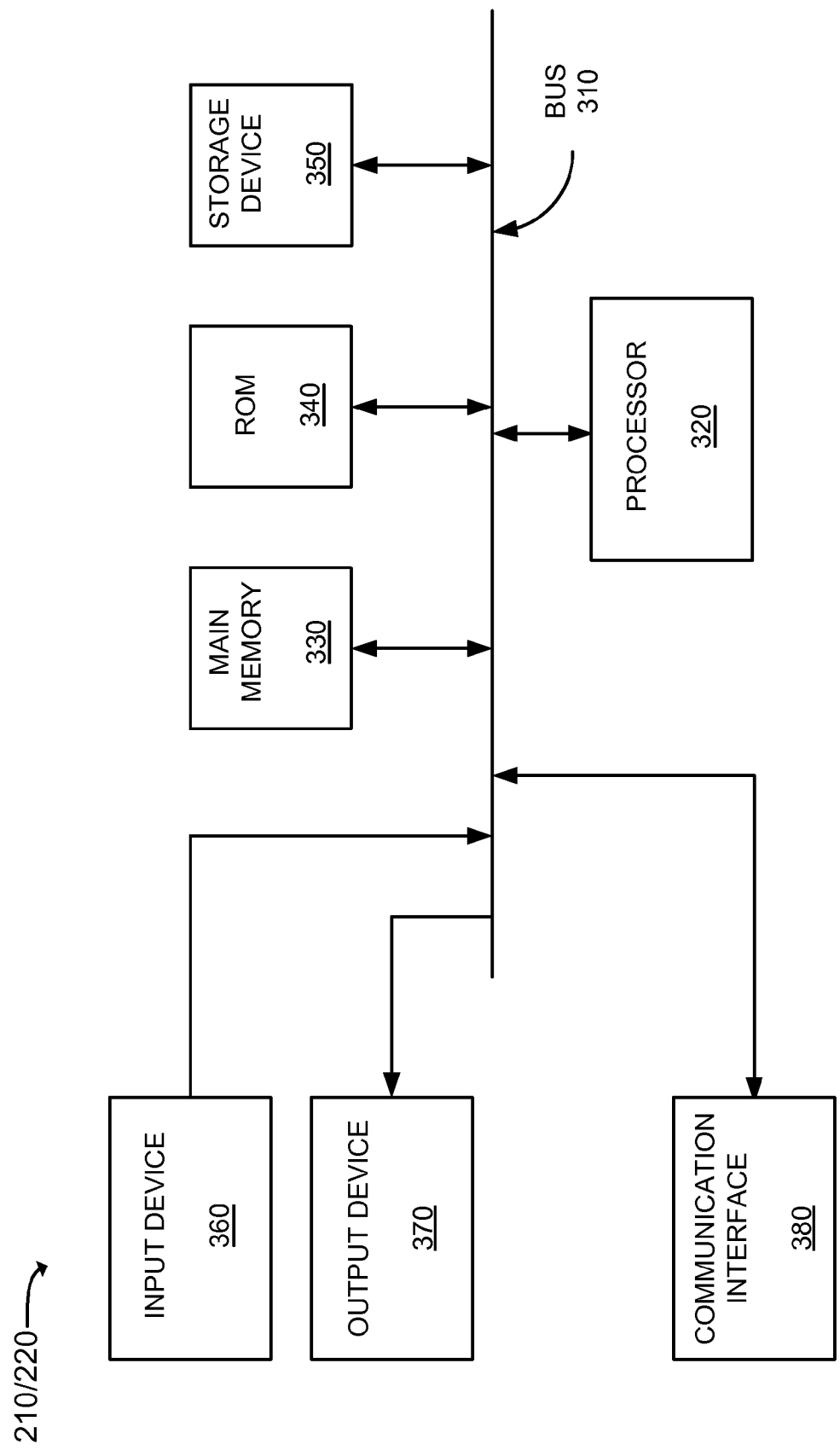
FIG. 3 is an exemplary diagram of a client or server according to one embodiment of the invention.

FIG. 3 is an exemplary diagram of a client 210 or server 220 according to an implementation consistent with the principles of the invention. Client/server 210/220 may include a bus 310, a processor 320, a main memory 330, a read only memory (ROM) 340, a storage device 350, an input device 360, one or more an output device 370, and a communication interface 380. Bus 310 may include a set of conductors that permit communication among the components of client/server 210/220.

Processor 320 may include a conventional processor or microprocessor that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include conventional mechanisms that permit a user to input information to client/server 210/220, such as a keyboard, a mouse, a pen, voice recognition and/or biometric mechanisms, etc. Output device 370 may include conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220, consistent with the principles of the invention, may implement near-duplicate component 225. Near-duplicate component 225 may be stored in a computer-readable medium, such as memory 330. A computer-readable medium may be defined as a physical or logical memory device and/or carrier wave.

The software instructions defining near-duplicate component 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of or in combination with software instructions to implement processes consistent with the present invention. Thus, implementations consistent with the principles of the invention are not limited to any specific combination of hardware circuitry and software.

Near-Duplicate Component

Figure 4:
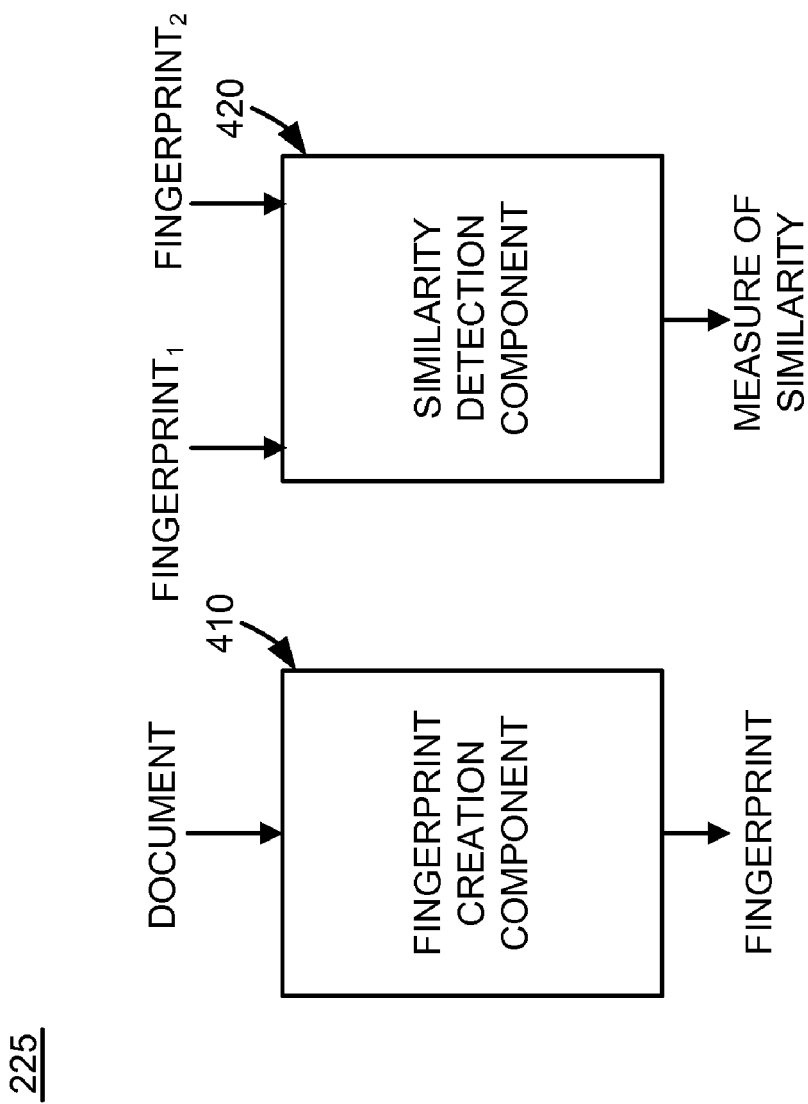
FIG. 4 is a block diagram illustrating functional components of the near-duplicate component shown in FIG. 2.

FIG. 4 is a block diagram illustrating functional components of near-duplicate component 225. As shown, near-duplicate component 225 includes a fingerprint creation component 410 and a similarity detection component 420. Fingerprint creation component 410 may receive an input document and generate a fingerprint that is a compact representation of the document. In one implementation, the fingerprints are each 128 bit (16 byte) values.

Similarity detection component 420 may generate a measure of similarity between two documents based on the fingerprints corresponding to the two documents. In one implementation, the measure of similarity may be computed as the hamming distance between its two input fingerprints. For binary values, the hamming distance can be defined as the number of digit positions in which the corresponding digits of two binary words of the same length are different. For example, the hamming distance between 1011101 and 1001001 is two. For a 128 bit fingerprint, a hamming distance of 18 may be used to distinguish whether two documents are near-duplicates, i.e., a hamming distance less than or equal to 18 can indicate near-duplicate documents, otherwise, the documents are considered non-near-duplicates. One of ordinary skill in the art will recognize that other threshold levels could be used depending on the particular application.

For larger thresholds, the probability for a false negative is lower but the probability for a false positive is higher. For smaller thresholds, the probability for a false positive is lower but the probability for a false negative is higher. A false negative is defined as two near-duplicate pages whose near-duplicate fingerprints have a hamming distance bigger than the threshold. A false positive is defined as two random pages whose near-duplicate fingerprints have a hamming distance smaller than the threshold. The choice of the threshold determines the balance between false positives and false negatives. Generally, a good choice for the threshold gives nearly the same probability for false positives and false negatives. However, it will be appreciated that various thresholds and proportions of false negatives or positives may be selected in alternative embodiments of the invention.

Fingerprint Creation Component

Two general operations may be performed by fingerprint creation component 410 to generate a fingerprint: sampling and compacting. More specifically, an input document is first sampled to generate a number of sampled blocks. If the two documents have x % difference (where x is generally a relatively small number), the sampled documents will generally have approximately x % difference. The sampled blocks are then compacted to obtain a fingerprint of an intended size. In one embodiment, the fingerprints of the two documents should have less than twice the x % difference.

Figure 5:
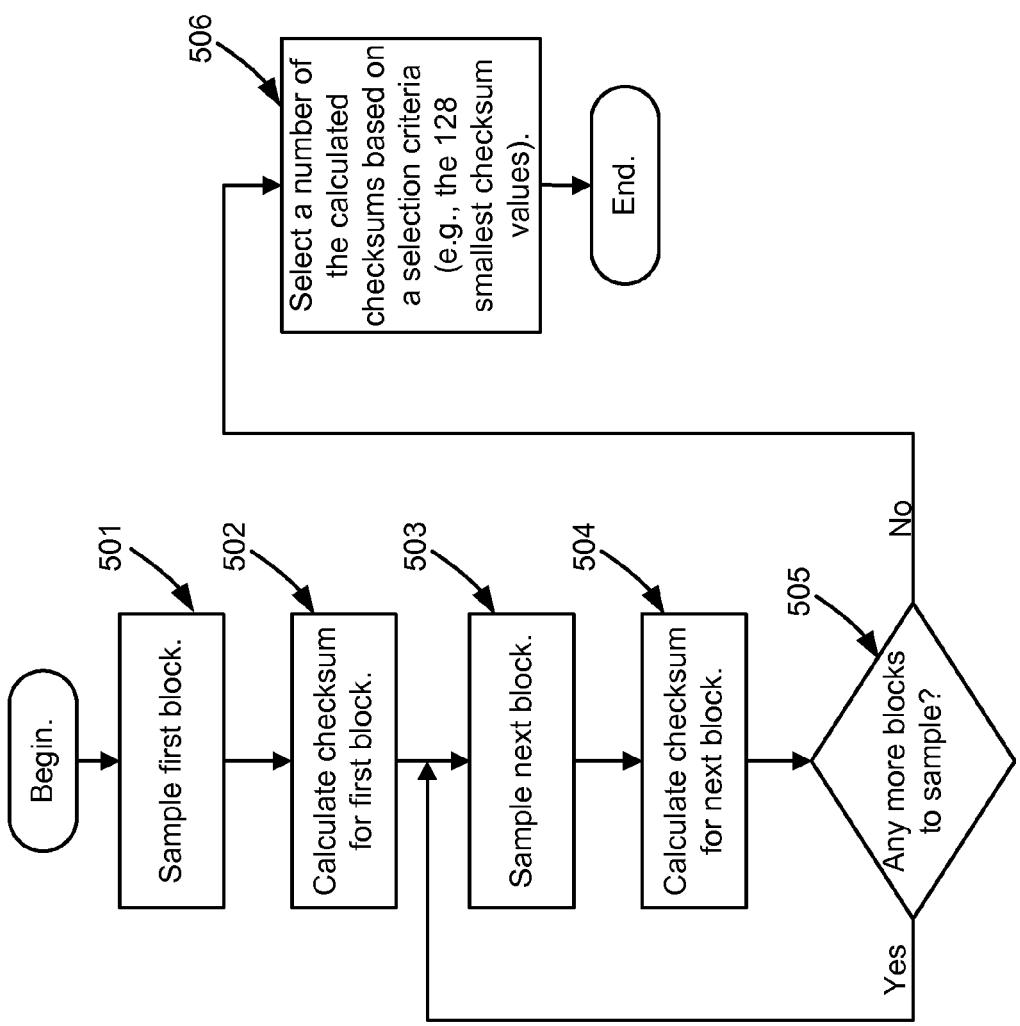
FIG. 5 is a flow chart illustrating operations consistent with one embodiment for sampling a document during fingerprint generation.

FIG. 5 is a flow chart illustrating a method for sampling a document during fingerprint generation, according to one embodiment of the invention. A first sample block from the input document may be obtained from a fixed-size sliding window applied to the document (act 501).

Figure 6:
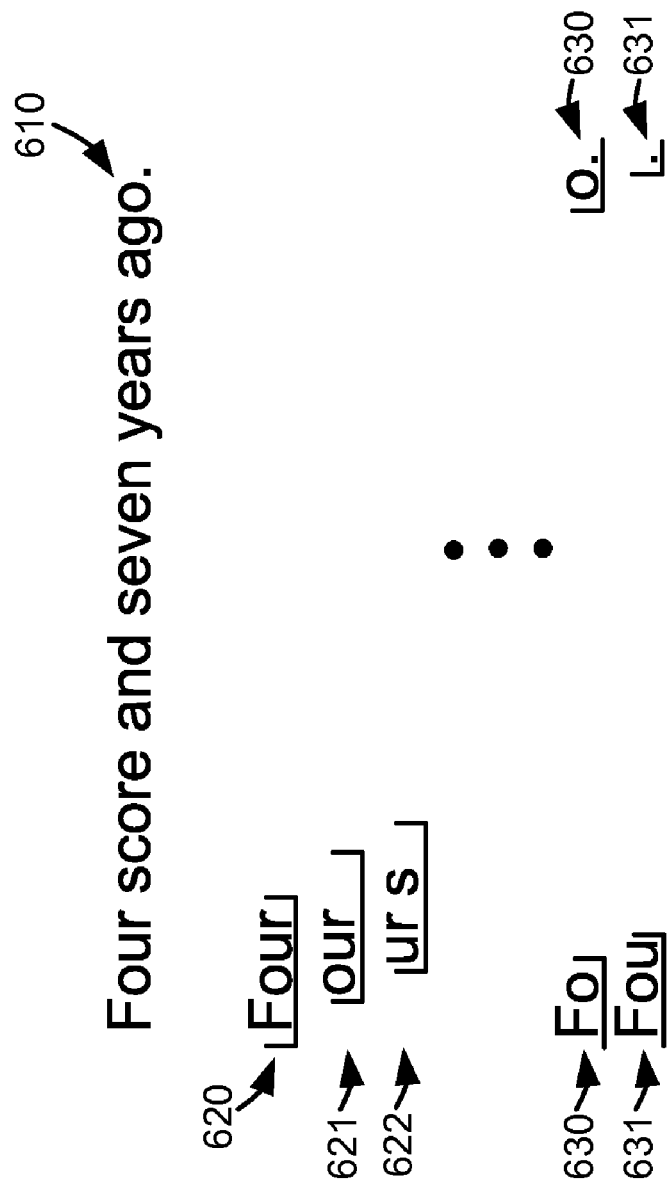
FIG. 6 is a diagram illustrating application of a fixed-sized sliding window.

FIG. 6 is a diagram illustrating application of a fixed-sized sliding window applied to a document. The simple exemplary document shown in FIG. 6 is document 610, which consists of the sentence "Four score and seven years ago." Assume that a 4 character (byte) block size is to be used. The first sampled block, block 620, includes the first four characters from the document ("Four"). A second sampled block, block 621, may include the second through fifth characters in the document ("our"). The third sampled block, block 622, may include the third through sixth characters in the document ("ur s"). In this manner, the sampled four-character blocks "slide" across the document. At the end of the document, boundary conditions may be handled by wrapping the sampling block back to the beginning of the document. Accordingly, the next-to-last sampled block, block 630, may be "o.Fo" and the last sampled block, block 631, may be ".Fou".

Although the sampled blocks shown in FIG. 6 are four bytes long, in practice, a longer (or even shorter) sampling size may be used. In one implementation, a 64-byte sampling block is used. When sampling documents smaller than the sampling size (e.g., 64 bytes), null characters may be padded to the end of the document until the document equals the sampling size.

Referring back to FIG. 5, a checksum may be computed for the first sampled block (act 502). For 64-byte sampled blocks, the checksum may be, for example, a 32-bit (4 byte) checksum. In general, a checksum is a number computed by combining characters from a file using a pre-determined mathematical function. Checksum functions are well known in the art, and a number of different checksum calculation functions may be used to generate the checksums. Alternatively, a hash function may be applied to the sampled blocks to generate the "checksum" values.

The operations of sampling and computing appropriate checksum values may be performed for each sampled block of the document (acts 503, 504, and 505). A set of the calculated checksum values may next be selected (act 506). For example, the smallest unique 128 checksums may be chosen. In other possible implementations, the largest unique 128 checksums may be chosen. In general, the chosen checksums will correspond to a series that corresponds to random block samplings from the document but that are predetermined in the sense that duplicate or near-duplicate documents will tend to have checksums chosen that correspond to the same text blocks. This set of checksums (e.g., 128 checksums) functions as an effective digest of the document.

Figure 7:
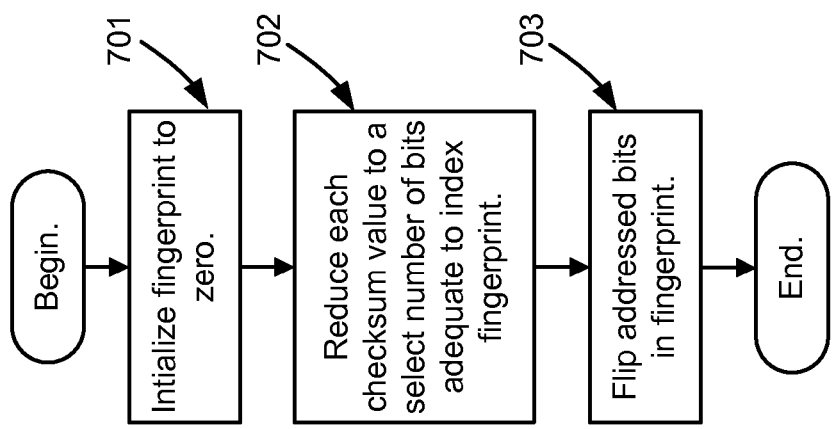
FIG. 7 is a flow chart illustrating operations consistent with an embodiment for compacting.

As previously mentioned, fingerprint creation component 410 generally performs sampling and compacting operations to generate the fingerprints. FIGS. 5 and 6 illustrate operations for the sampling. In general, compacting refers to reducing the size of the sampled information to obtain a fingerprint suitable for near-duplicate detection. FIG. 7 is a flow chart illustrating a method for compacting, according to one embodiment of the invention. The compacting is performed on the set of checksums generated in act 506. One of ordinary skill in the art will recognize that other compacting techniques could be used.

Figure 8:
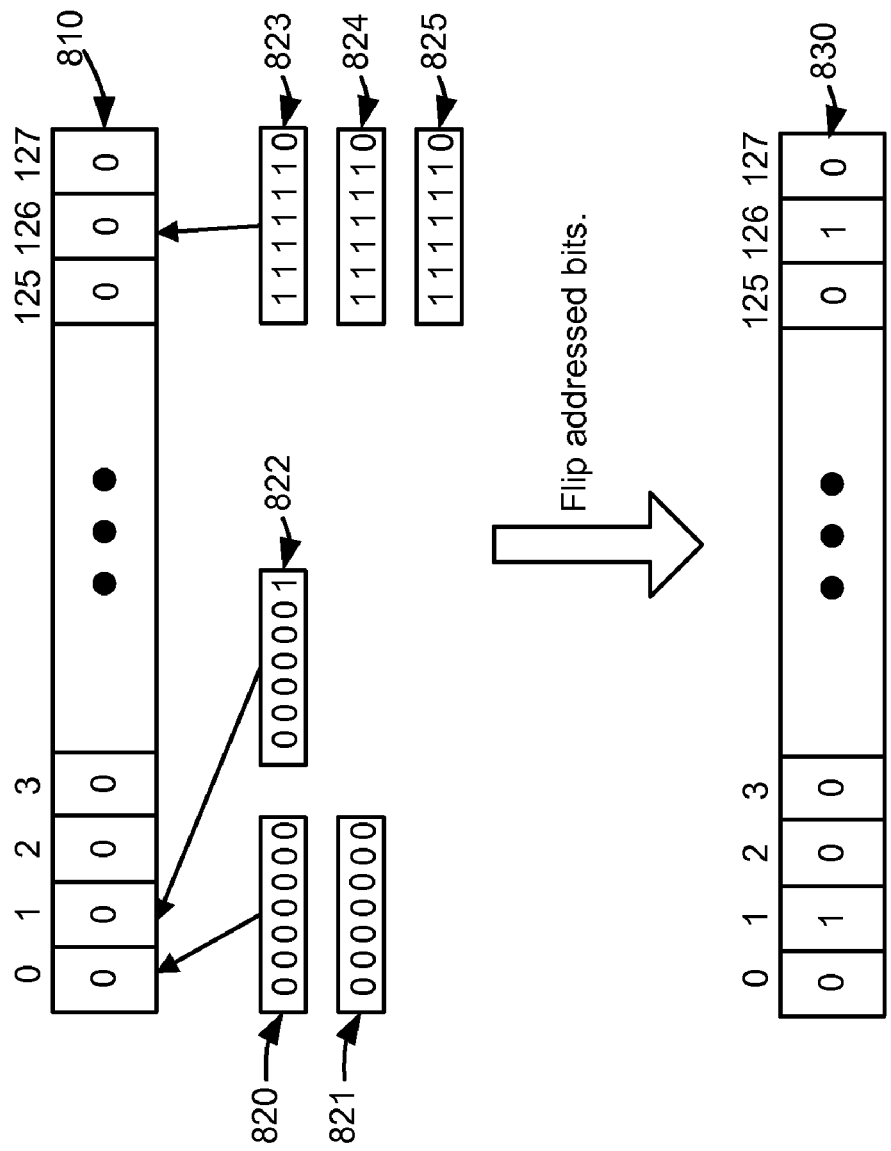
FIG. 8 is a diagram conceptually illustrating acts performed with respect to FIG. 7.

Fingerprint creation component 410 may begin by initializing the fingerprint value to zero (act 701). FIG. 8 is a diagram conceptually illustrating acts performed FIG. 7. A fingerprint value 810 is shown as a 128 bit value initialized to zero.

The checksums generated in act 506 (FIG. 5) are used to index bits in fingerprint 810. To this end, the checksums may be reduced in length to a length that addresses fingerprint 810 (act 702). In the exemplary implementation described herein, for a 128 bit fingerprint 810, seven bits are required (2 to the seventh power is 128). Accordingly, each of the checksums may be reduced in length to seven bits. The length reduction can be performed via a hashing algorithm. In one implementation, the hashing algorithm may be implemented by taking the least significant seven bits from each checksum. One of ordinary skill in the art will recognize that other, perhaps more complicated, hashing algorithms could be used.

In FIG. 8, six exemplary checksum values, 820-825, are shown after being hashed to seven bits. Each one of values 820-825 addresses a bit in fingerprint 810. Multiple ones of values 820-825 may address the same bit in fingerprint 810. As shown, values 820 and 821 address the same bit (bit zero) and values 823-825 address the same bit (bit 126). Value 822 addresses bit one. Some bits in fingerprint 810 may not be addressed.

The bit addressed by a hashed version of a checksum value is flipped each time it is addressed (act 703). Fingerprint 830 illustrates the fingerprint after bit flipping. Bit zero of fingerprint 830 was flipped by value 820 and then flipped back by value 821 and has a final bit value of zero. Bit one was flipped by value 822 for a flipped value of one. Bit 126 was flipped three times, once by each of values 823-825, resulting in a final bit value of one.

After bit flipping, the final fingerprint 830 provides a compact representation of the input document for near-duplicate detection.

Exemplary Implementation

Figure 9:
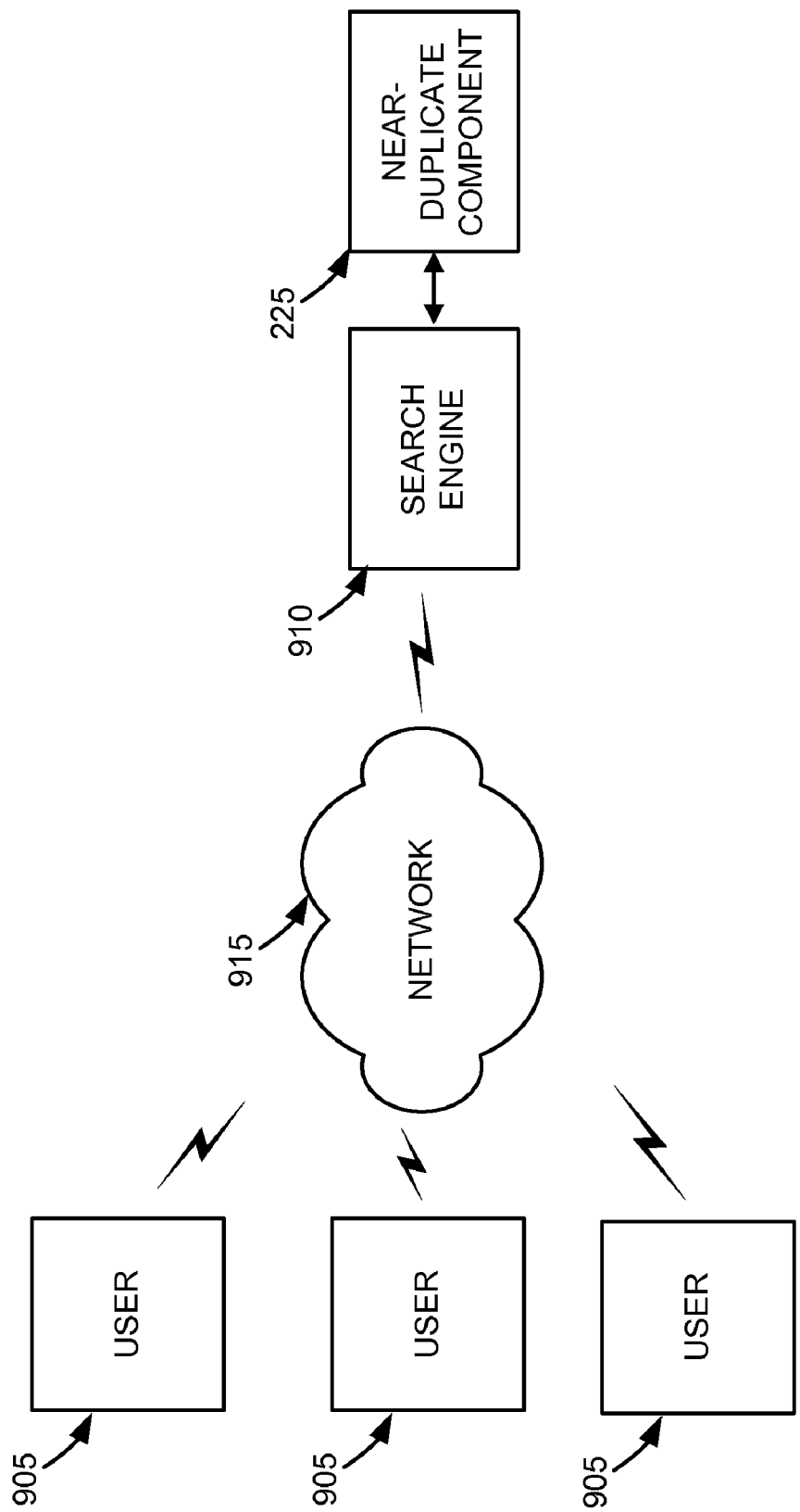
FIG. 9 is a diagram illustrating an exemplary implementation of the near-duplicate component in the context of an Internet search engine.

FIG. 9 is a diagram illustrating an exemplary implementation of near-duplicate component 225 in the context of an Internet search engine. A number of users 905 may connect to a search engine 910 over a network 915, such as the Internet. Search engine 910 may be a traditional search engine that returns a ranked set of documents related to a user query. Search engine 910 may be a general search engine, such as one based on all documents from a large collection, such as documents on the web, or a more specialized search engine, such as a news search engine. In other implementations, search engine 910 may be implemented over a specialized corpus of documents, such as a corporate document database made available over a corporate network 915.

In operation, search engine 910 may receive a user query and generate a list of documents (search results) that contain the terms of the user query. Near-duplicate component 225 may be used by search engine 910 when indexing documents. For example, search engine 910 may use near-duplicate component 225 to avoid redundantly indexing/storing multiple versions of a same or very similar document.

Near-duplicate component 225 can be used in applications other than assisting search engines. For example, the nearest duplicates of two documents can be used as a base for differential compression.

Conclusion

Techniques for efficiently representing documents for near-duplicate detection were described with reference to exemplary embodiments of the invention.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results. Additionally, although primarily described in the context of web sites on the Internet, the concepts discussed above could be applied to other applications.

No element, act, or instruction used in the description of the present application should be construed as critical or essential to the invention unless explicitly described as such. Also, as used herein, the article "a" is intended to include one or more items.

What is claimed:

1. A computer device comprising:
   a memory to store instructions for implementing:
      a fingerprint creation component to generate a fingerprint of a particular length for an input document, where, to generate the fingerprint, the fingerprint creation component is to:
         sample the input document to obtain a plurality of sampled blocks,
         generate a set of checksum values from the plurality of sampled blocks, where each checksum value, in the set of checksum values, corresponds to an address of a respective one of a plurality of bits of the fingerprint, and
         generate the fingerprint by flipping a particular bit, of the plurality of bits of the fingerprint, a quantity of times based on a quantity of checksum values, in the set of checksum values, that corresponds to the address of the particular bit; and
   a processor to execute the instructions in the memory.

2. The computer device of claim 1, further including:
   a similarity detection component to compare a pair of fingerprints to determine whether the pair of fingerprints indicates that documents, associated with the pair of fingerprints, correspond to near-duplicate documents, where the fingerprint is one of the fingerprints in the pair of fingerprints.

3. The computer device of claim 2, where, when comparing the pair of fingerprints, the similarity detection component is to calculate a hamming distance between the pair of fingerprints.

4. The computer device of claim 3, where the similarity detection component determines that the pair of fingerprints corresponds to near-duplicate documents when the hamming distance between the pair of fingerprints is below a threshold.

5. The computer device of claim 2, further including:
   a search engine to index and store information regarding only one of the documents when the documents are determined to be near-duplicate documents, based on a comparison of the pair of fingerprints associated with the documents.

6. The computer device of claim 1, where the set of checksum values is a subset of checksum values generated for the input document, and
   where the fingerprint creation component is further to:
      select the subset of checksum values as a particular number of smallest, unique checksum values of the checksum values generated for the input document.

7. The computer device of claim 1, where the set of checksum values is a subset of checksum values generated for the input document, and
   where the fingerprint creation component is further to:
      select the subset of checksum values as a particular number of largest, unique checksum values of the checksum values generated for the input document.

8. The computer device of claim 1, where the fingerprint creation component is further to reduce a length of a checksum value, in the set of checksum values, to a particular length, where the checksum value, of the particular length, corresponds to an address of one of the plurality of bits of the fingerprint based on the checksum value matching the address of the one of the plurality of bits of the fingerprint.

9. The computer device of claim 8, where, when reducing the length of the checksum value, the fingerprint creation component is to subject the checksum value to a hashing algorithm to reduce the length of the checksum value to the particular length.

10. The computer device of claim 8, where, when reducing the length of the checksum value, the fingerprint creation component is to select a particular quantity of bits of the checksum value to reduce the length of the checksum value to the particular length.

11. A system comprising:
    one or more computer devices configured to:
       sample a document to obtain a plurality of sampled blocks,
       generate a set of checksum values from the plurality of sampled blocks, where each checksum value, in the set of checksum values, identifies a respective one of a plurality of bits of a fingerprint for the document, and
       generate the fingerprint, for the document, by flipping each bit, of the plurality of bits of the fingerprint, a quantity of times based on a quantity of checksum values, in the set of checksum values, that identify the bit.

12. The system of claim 11, where the one or more computer devices are further to:
    compare a pair of fingerprints to determine whether the pair of fingerprints corresponds to near-duplicate documents, where the fingerprint is one of the fingerprints in the pair of fingerprints.

13. The system of claim 11, where the set of checksum values is a subset of checksum values generated for the document, and
    where the one or more computer devices are to:
       select the subset of checksum values as a particular number of smallest, unique checksum values of the checksum values generated for the document.

14. The system of claim 11, where the set of checksum values is a subset of checksum values generated for the document, and
where the one or more computer devices are to:
select the subset of checksum values as a particular number of largest, unique checksum values of the checksum values generated for the document.

15. The system of claim 11, where the one or more computer devices are to:
hash the checksum values, in the set of checksum values, to form hashed checksum values, where one of the hashed checksum values identifies one of the plurality of bits of the fingerprint.

16. The computer-implemented device of claim 11, where the one or more computer devices are to:
initialize each of the plurality of bits of the fingerprint to a particular value before flipping any of the plurality of bits of the fingerprint.

17. A method, performed by one or more server devices, the method comprising:
generating, by one or more processors associated with the one or more server devices, a plurality of checksum values based on a document;
reducing, by one or more processors associated with the one or more server devices, lengths of the plurality of checksum values to form a plurality of reduced-length checksum values, where each reduced-length checksum value, of the plurality of reduced-length checksum values, matches an address of a respective one of a plurality of bits of a fingerprint corresponding to the document; and
generating, by one or more processors associated with the one or more server devices, the fingerprint, corresponding to the document, by flipping each bit, of the plurality of bits of the fingerprint, based on a quantity of reduced-length checksum values, of the plurality of reduced-length checksum values, that matches the address of the bit.

18. The method of claim 17, where reducing lengths of the plurality of checksum values includes:
hashing each of the plurality of checksum values to a particular size.

19. The method of claim 18, where the hashing includes selecting a quantity of bits of each of the plurality of checksum values.

20. The method of claim 18, further comprising:
initializing, prior to flipping any bits of the plurality of bits of the fingerprint, the fingerprint by setting all of the plurality of bits of the fingerprint to a particular value.

21. The method of claim 17, where the plurality of checksum values is a subset of checksum values generated for the document, and
where the method further comprises:
selecting the subset of checksum values as a particular number of smallest, unique checksum values of the checksum values generated for the document.

22. The method of claim 17, where the plurality of checksum values is a subset of checksum values generated for the document, and
where the method further comprises:
selecting the subset of the checksum values as a particular number of largest, unique checksum values of the checksum values generated for the document.

23. The method of claim 17, further comprising:
comparing a pair of fingerprints to determine whether the pair of fingerprints indicates that documents, associated with the pair of fingerprints, correspond to near-duplicate documents, where the fingerprint is one of the fingerprints in the pair of fingerprints.

24. The method of claim 23, further comprising:
providing the documents to a user as a single link when the documents are determined to be near-duplicate documents based on a comparison of the pair of fingerprints associated with the documents.

25. A computer device, comprising:
a memory to store instructions for implementing:
a fingerprint creation component to generate a fingerprint of a particular length for a document, where, to generate the fingerprint, the fingerprint creation component is to:
generate a plurality of checksum values based on the document,
reduce lengths of the plurality of checksum values to form a plurality of reduced-length checksum values, where each reduced-length checksum value, of the plurality of reduced-length checksum values, matches an address of a respective one of a plurality of bits of the fingerprint corresponding to the document, and
generate the fingerprint, corresponding to the document, by flipping each bit, of the plurality of bits of the fingerprint, based on a quantity of reduced-length checksum values, of the plurality of reduced-length checksum values, that matches the address of the bit; and
a processor to execute the instructions in the memory.

26. The computer device of claim 25, where, when reducing lengths of the plurality of checksum values, the fingerprint creation component is to:
hash each of the plurality of checksum values to a particular size, or
select a quantity of bits of each of the plurality of checksum values.

27. The computer device of claim 25, where the fingerprint creation component is further to initialize, prior to flipping any bits of the plurality of bits of the fingerprint, the fingerprint by setting all of the plurality of bits of the fingerprint to a particular value.

28. A system, comprising:
one or more computer devices to:
generate a plurality of checksum values based on a document;
reduce lengths of the plurality of checksum values to form a plurality of reduced-length checksum values, where each reduced-length checksum value, of the plurality of reduced-length checksum values, matches an address of a respective one of a plurality of bits of a fingerprint corresponding to the document; and
generate the fingerprint, corresponding to the document, by flipping each bit, of the plurality of bits of the fingerprint, based on a quantity of reduced-length checksum values, of the plurality of reduced-length checksum values, that matches the address of the bit.

29. The system of claim 28, where the one or more computer devices are further to:
compare a pair of fingerprints to determine whether the pair of fingerprints indicates that documents, associated with the pair of fingerprints, correspond to near-duplicate documents, where the fingerprint is one of the fingerprints in the pair of fingerprints.

30. The system of claim 29, where the one or more computer devices are further to:
provide the documents to a user as a single link when the documents are determined to be near-duplicate documents based on a comparison of the pair of fingerprints associated with the documents.

31. A method performed by one or more server devices, the method comprising:
sampling an input document to obtain a plurality of sampled blocks;
generating a set of checksum values from the plurality of sampled blocks, where each checksum value, in the set of checksum values, corresponds to an address of a respective one of a plurality of bits of a fingerprint for the input document; and
generating the fingerprint by flipping a particular bit, of the plurality of bits of the fingerprint, a quantity of times based on a quantity of checksum values, in the set of checksum values, that corresponds to the address of the particular bit.

32. The method of claim 31, further comprising:
comparing a pair of fingerprints to determine whether the pair of fingerprints indicates that documents, associated with the pair of fingerprints, correspond to near-duplicate documents, where the fingerprint is one of the fingerprints in the pair of fingerprints; and
determining that the pair of fingerprints corresponds to near-duplicate documents when a hamming distance between the pair of fingerprints is below a threshold.

33. The method of claim 31, further comprising:
comparing a pair of fingerprints to determine whether the pair of fingerprints indicates that documents, associated with the pair of fingerprints, correspond to near-duplicate documents, where the fingerprint is one of the fingerprints in the pair of fingerprints; and
indexing and storing information regarding only one of the documents when the documents are determined to be near-duplicate documents, based on the comparison of the pair of fingerprints associated with the documents.

34. A method performed by one or more server devices, the method comprising:
sampling a document to obtain a plurality of sampled blocks;
generating a set of checksum values from the plurality of sampled blocks, where each checksum value, in the set of checksum values, identifies a respective one of a plurality of bits of a fingerprint for the document; and
generating the fingerprint, for the document, by flipping each bit, of the plurality of bits of the fingerprint, a quantity of times based on a quantity of checksum values, in the set of checksum values, that identify the bit.

35. The method of claim 34, further comprising:
hashing the checksum values, in the set of checksum values, to form hashed checksum values, where one of the hashed checksum values identifies one of the plurality of bits of the fingerprint.

36. The method of claim 34, further comprising:
initializing each of the plurality of bits of the fingerprint to a particular value before flipping any of the plurality of bits of the fingerprint.

* * * * *